(12) United States Patent
Biedscheid

(10) Patent No.: US 9,051,051 B1
(45) Date of Patent: Jun. 9, 2015

(54) FLOATING AIRCRAFT ARCHWAY AND METHOD THEREFOR

(75) Inventor: Rick Biedscheid, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/325,825

(22) Filed: Dec. 14, 2011

(51) Int. Cl.
  *B64C 1/00* (2006.01)
  *B64D 11/00* (2006.01)
  *B64C 1/06* (2006.01)

(52) U.S. Cl.
  CPC .. *B64D 11/00* (2013.01); *B64C 1/06* (2013.01)

(58) Field of Classification Search
  CPC .......... B64D 11/04; B64D 2011/0046; B64C 1/068; B64C 1/06; B64C 2001/00
  USPC ............. 244/118.5, 118.6, 117, 118.1, 118.2, 244/119
  See application file for complete search history.

(56) References Cited

U.S. PATENT DOCUMENTS

| | | | | |
|---|---|---|---|---|
| 3,102,607 | A * | 9/1963 | Roberts | 186/40 |
| 3,999,630 | A * | 12/1976 | McPhee | 186/40 |
| 4,648,570 | A * | 3/1987 | Abdelmaseh et al. | 244/118.1 |
| 5,108,048 | A * | 4/1992 | Chang | 244/118.1 |
| 6,536,710 | B1 * | 3/2003 | Bobzien et al. | 244/119 |
| 6,883,753 | B1 * | 4/2005 | Scown | 244/118.1 |
| 7,252,267 | B2 | 8/2007 | Young | |
| 8,403,266 | B2 * | 3/2013 | Fokken et al. | 244/131 |
| 2008/0277527 | A1 * | 11/2008 | Fokken et al. | 244/118.1 |

\* cited by examiner

*Primary Examiner* — Philip J Bonzell
(74) *Attorney, Agent, or Firm* — Weiss & Moy. P.C.

(57) ABSTRACT

A floating archway within an aircraft attaches to a lattice section, a plurality of support members and a plurality of tie rods coupling the lattice section to the plurality of support members.

20 Claims, 14 Drawing Sheets

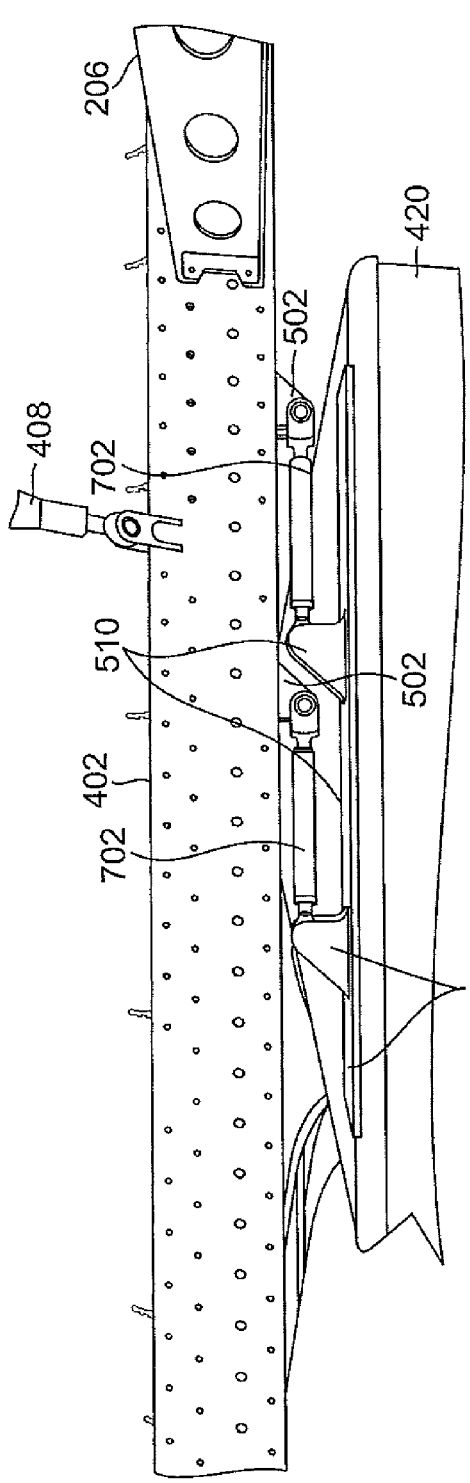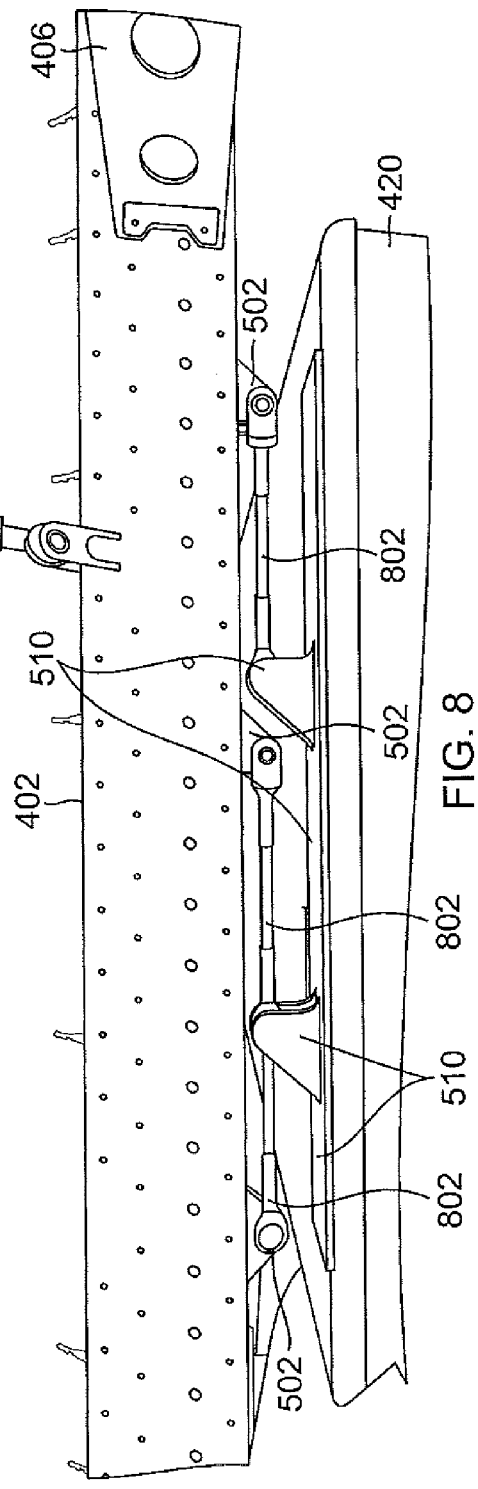

FLOATING AIRCRAFT ARCHWAY AND METHOD THEREFOR

BACKGROUND

Embodiments of this disclosure generally relate to an aircraft, and more particularly, to a structure coupled to the aircraft that may be used to remove existing trusses and a floating archway ceiling to expand an overall look and feel of a cabin.

Referring to FIG. 1, an isometric view of a galley monument support 100 with trusses 108 is provided. The trusses 108 may include one or more triangular units constructed with straight members 114 whose ends may be connected to rails 140. The truss 108 may be provided in three dimensions with a lower section 110 of the truss connected to the monument 102 via tie rods 116. The truss 108 may include angular sections 112 that provide support to the lower section 110 of the truss 108.

The monument 102 coupled to the support 100 may be connected by a number of tie rods 116. The existing rails 140 may span the length of the aircraft. Cross bars 106 may be positioned along the length of the aircraft. The cross bars 106 may couple the rails 140 to the outboard rails 170. Ceiling panels 180 can be connected to the support 100.

FIG. 2 is a side view of the support 100 of FIG. 1. As shown, the trusses 108 may be connected to the rails 102 through the straight members 114. The angular sections 112 as well as the lower section 110 of the trusses 108 may then be coupled to the monument 102. The ceiling panels 180 may be arched which correspond to the angular sections 112 of the galley monument support 100.

In many aircraft, the monument 102 may be a heavy item. The monument 102 may tend to roll over under forward loading conditions. Trusses 108 may prevent these conditions for monuments 102. Trusses 108 may define the structure and therefore the interior of an aircraft. Current trusses 108 may limit the height of the monument 102 within the aircraft. Current archways may be fixed about the door centerline and create aesthetic issues since many main deck monuments, like galleys, may not reside symmetrically about the door centerline.

The trusses 108 may limit the height of the monument 102 within an aircraft and may be structurally inefficient. Accordingly, by removing trusses 108, there may exist the potential to add more seats within the aircraft. For example, the overhead area opened up by removing trusses may be used to store carts freeing up additional main deck space for seats or to add seats directly in the overhead space in the form of current 777 overhead crew rests.

Other benefits of removing trusses 108 may include reducing weight to the aircraft. Trusses 108 may weight forty to fifty pounds or more with four to six trusses 108 within each aircraft. The interior weight of an aircraft may be reduced by up to 150 lbs. Furthermore, trusses 108 may be expensive to produce and install within the aircraft. Finally, the use of trusses 108 may result in higher fuel costs than if they were not present.

As such, by removing the trusses 108, and using other components, the final product costs may be reduced. Therefore, it would be desirable to provide a system and method that overcomes the above problems while enhancing the interior look and feel of the aircraft.

SUMMARY

A structure for securing a galley has a first rail extending longitudinally and a second rail extending longitudinally. Fastening members from the first and second rails are connected with fittings on the galley through tie rods or cables.

A floating archway within an aircraft attaches to a lattice section, a plurality of support members and a plurality of tie rods coupling the lattice section to the plurality of support members.

A method for configuring an aircraft cabin comprising: attaching fastening members to first and second rails; and securing the fastening members to fittings on at least one galley through tie rods or cables.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein:

FIG. 7 is a side view of the aircraft super galley fitting;

FIG. 8 is a side view of another aircraft super galley fitting;

DETAILED DESCRIPTION

Figure 3:
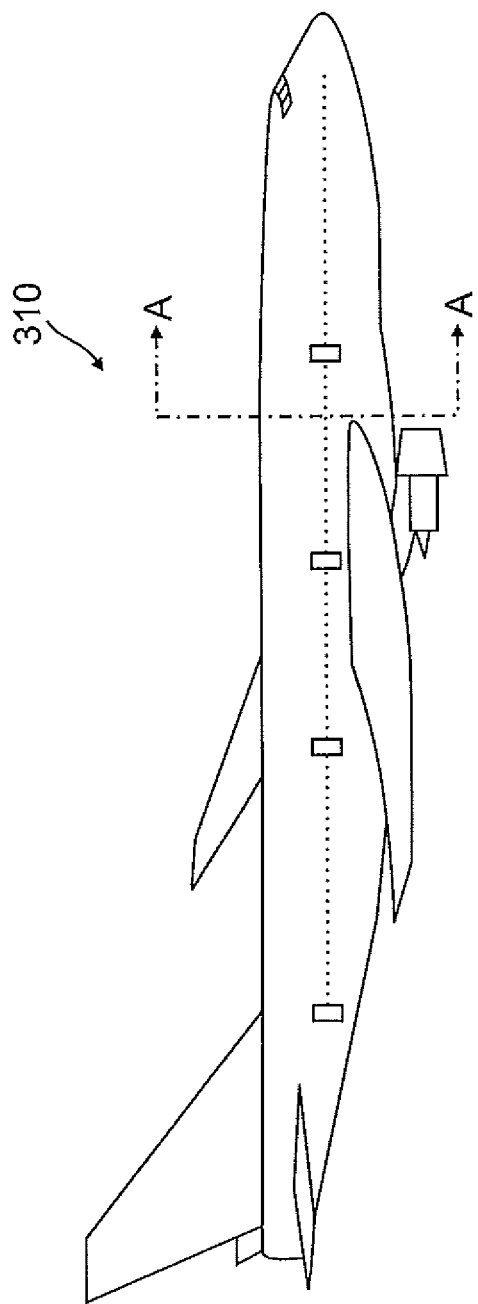
FIG. 3 is a side view of an exemplary aircraft.

Turning to FIG. 3, a side view of an exemplary aircraft 310 is provided. An archway placed within the aircraft 310. The archway of the aircraft 310, as disclosed herein, may be referred to as a floating archway. The archway may reduce costs and result in modifications to system transport elements, such as electrical wiring, water lines, or environment control system ducts. The archway may be placed in between galleys or super galleys.

In one exemplary embodiment, one or more floating archways may be provided within the aircraft 310. Aesthetically, the archway may provide a more open feel as well as increase cabin space. The archway may allow components to be raised. By using floating archways and super galleys, the arch shaped paneling provided as a cover up within the interior may be removed.

By using a floating archway, an aircraft chiller may be elevated by, for example, one or more feet without using a truss structure. Furthermore, a floating archway may provide a more integrated look for outboard lavatories or galley monuments. In this regard, system connections servicing these monuments may be readily accessible. Advantageously, additional galley storage area may be made available in a super galley.

Figure 4A:
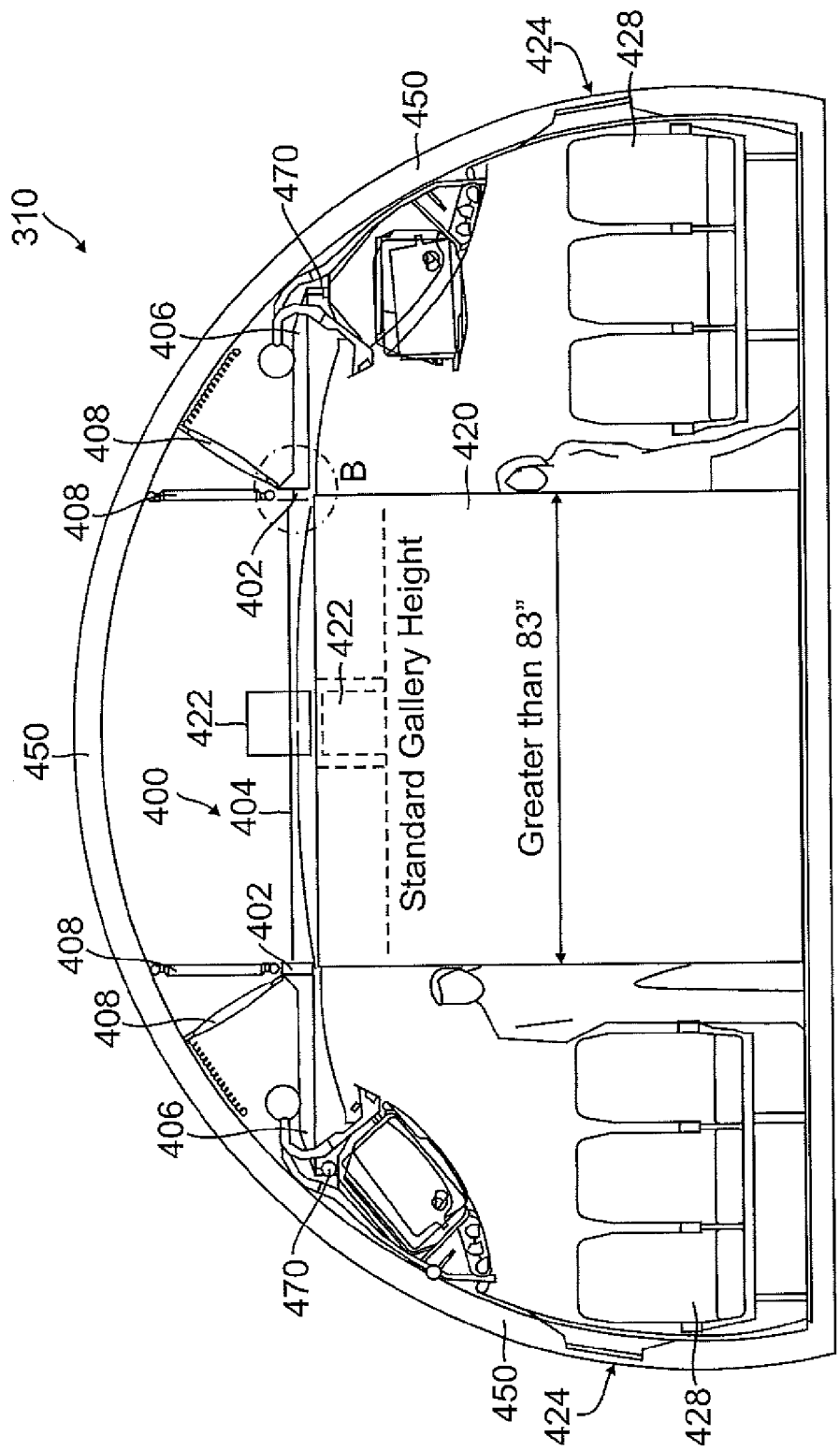
FIGS. 4A and 4B are cross-section views of the exemplary aircraft taken along line A-A as shown in FIG. 3.
Figure 4B:
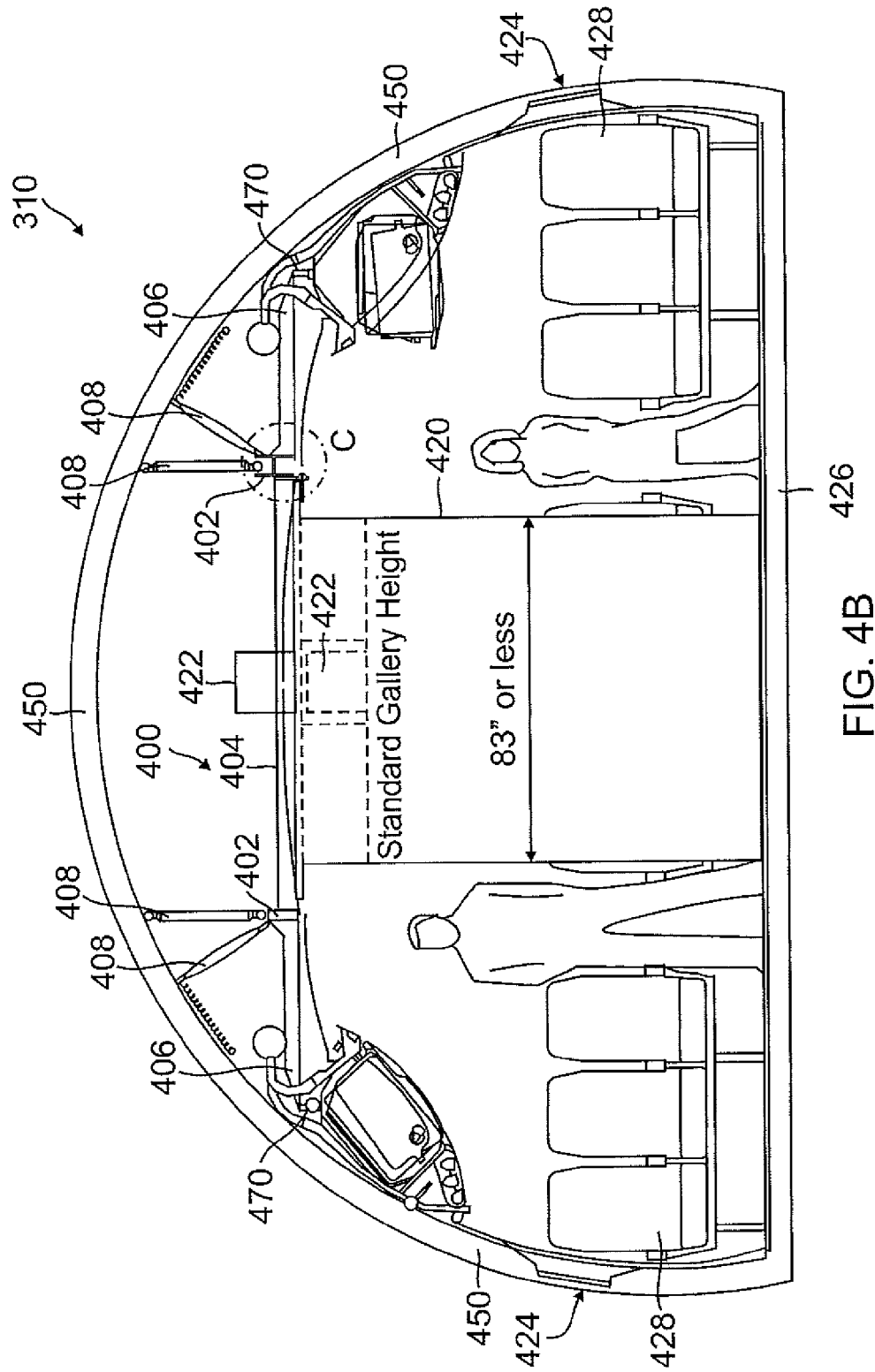

FIGS. 4A and 4B are cross sectional views of the exemplary aircraft 310 taken along line A-A as shown in FIG. 3. Other cross sections may be taken along the length of the aircraft 310 that may show other or additional features. The lattice structure 400 above the archway may include, but is not limited to, rails 402, beams 404, cross bars 406 and coupling members 408. The lattice structure 400 may also include outboard rails 470 which may be coupled to the rails 402 through a number of cross bars 406. Similar to the rails 402, the outboard rails 470 may extend the length of the aircraft 310 or a portion thereof.

Before describing the particular components within the lattice structure 400, features of the interior of the aircraft 310 are disclosed. The lattice structure 400 may span over a galley or super galley 420. The galley 420 may extend from one aisle 428 to another. The height of the galley 420 may begin at the floor 426 of the aircraft 310 to approximately the bottom of the lattice structure 400.

In FIGS. 4A and 4B, entryways 424 may be placed on the sides of the aircraft frame 450. Windows or other features may be placed or embedded between the frames 450. The aircraft frame 450 may have an arcuate shape. The frame 450 may be made of composite materials. Other system components may be secured through the lattice structure 400. As will become apparent from the description provided below, the chiller 422 or other components may be raised by removing trusses. In one embodiment, the chiller 422 may be raised by a foot.

Referring now to the lattice structure 400, the rails 402 may have an H-shape and extend longitudinally across the length of the aircraft 310. The rail 402 may have an H-shape at portions or the entire length of the rail 402. The rails 402 may incorporate class 3 size holes. These holes may be used to connect cross bars 406. The holes may also be used to couple beams 404. The rails 402 may be pre-existing in many aircraft 310.

The lattice structure 400 may also include beams 404. Many beams 404 may be used. The beams 404 may extend between a first rail 402 and second rail 402 within the lattice structure 400. The beams 404 may be spaced apart across different portions of the rails 402 to provide support for the right side of the lattice structure 400 at multiple places. The beams 404 may be coupled to the class 3 size holes of the rails 402. Through the rails 402, cross bars 406, outboard rails 470, coupling members 408 and beams 404, a lattice structure 400 may be formed.

Cross bars 406 may extend radially outward from the rails 402. As depicted, the cross bar 406 may be coupled to an outboard rail 470. One or many cross bars 406 may be coupled along the length of the rails 402. The cross bars 406 may provide tensile strength to the lattice structure 400.

The lattice structure 400 may also include coupling members 408. The coupling members 408 may be tie rods that may be positioned perpendicularly to the cross bars 406 or at an angle as shown in FIGS. 4A and 4B. The coupling members 408 may be connected to a top portion of the aircraft frame 450. In one embodiment, a single set of coupling members 408 may be used that are perpendicular to the cross bars 406.

Figure 5:
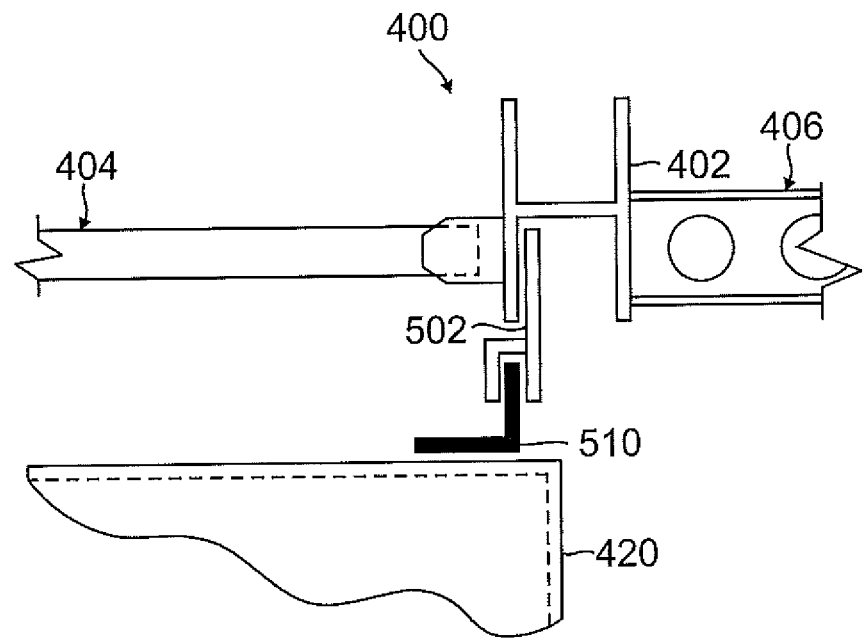
FIG. 5 is a closer sectional view of an aircraft super galley fitting taken within circle B as shown in FIG. 4A.
Figure 6:
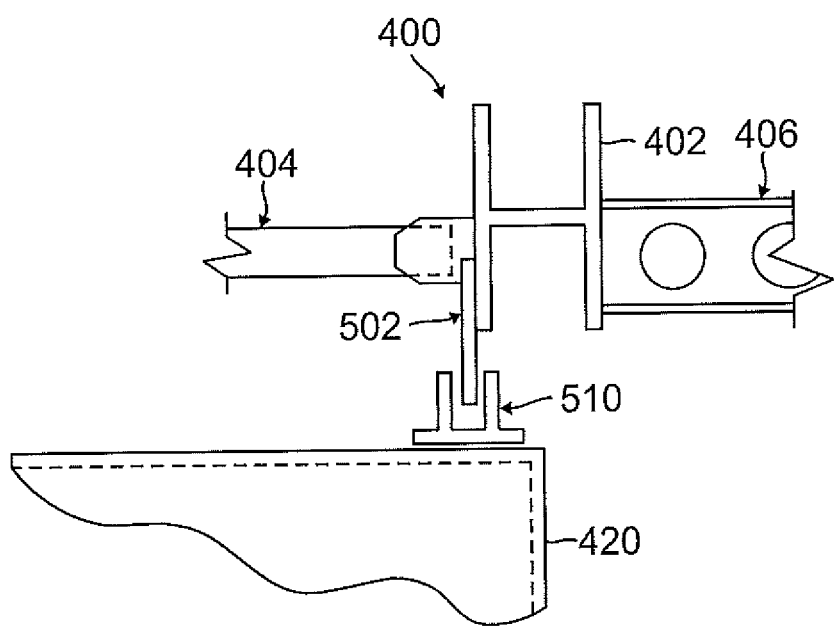
FIG. 6 is a closer sectional view of another aircraft super galley fitting taken within circle B as shown in FIG. 4A.

Referring to FIGS. 5 and 6, with super galleys wider than 83", an expanded view of the super galley fitting taken along circle B of FIG. 4A is shown. The rail 402, as described before, may take on an H-shape. A fastening member 502 may be coupled to the rail 402. A super galley fitting 510 may then be tied to the fastening member 502 through tie rods or cables, which will be described in more detail below. FIG. 4B (super galleys 83" wide or less) is an additional cross sectional view with similar circle B components.

FIG. 5 provides a closer sectional view of the aircraft 310 taken within circle B as shown in FIG. 4A. In the shown embodiment, the rail 402 has an H-shape. The H-shaped rail 402 may be attached to the top of the aircraft frame 450 through coupling members 408, not shown. The coupling members 408 may be positioned perpendicular to the beams 404 and cross bars 406 or at an angle. In turn, the beam 404 may be coupled to at least one rail 402. Crossbars 406 may be coupled to the rail 402.

Figure 9:
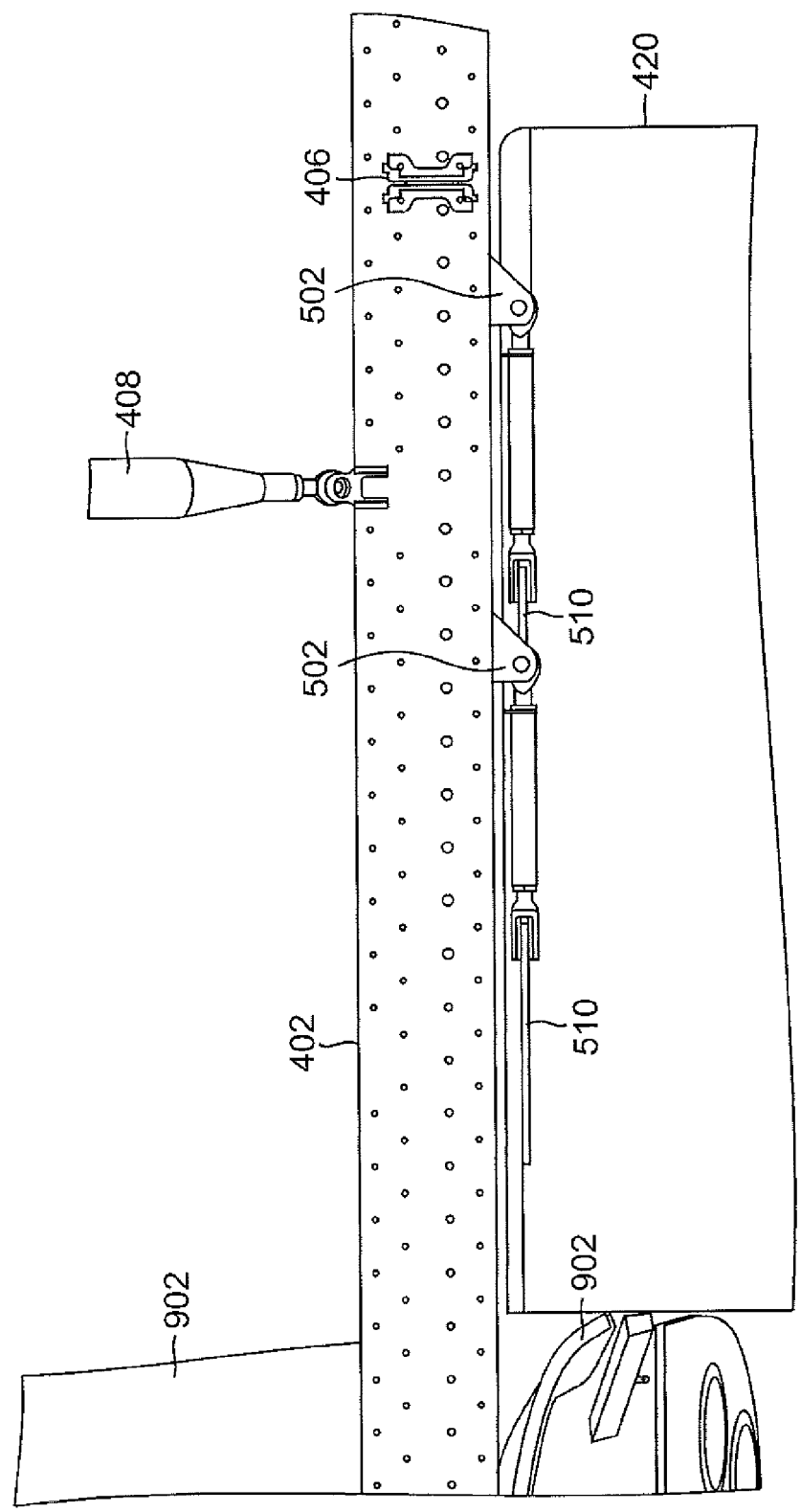
FIG. 9 is a side view of another aircraft super galley fitting with a floating archway taken from the right side of circle C as shown in FIG. 4B.

A fastening member 502 may be coupled to a rail 402 and super galley fitting 510. Tie rods or cables may be used to connect the fastening members 502 and super galley fittings 510 as shown in FIGS. 7, 8 and 9. The super galley 420 and components within the super galley 420 may be secured through the lattice structure 400. Through the fastening members 502 and super galley fittings 510, there may be small to no vertical or side loads.

The fastening member 502, shown in FIGS. 5 and 6, may come in multiple pieces. The fastening member 502 may have two parallel extensions for placement of a tie rod or cable therebetween. Alternatively, the fastening member 502 may come in a single piece, while the super galley fitting 510 may have two parallel extensions for securing the tie rod or cable as shown in FIGS. 7, 8 and 9. The super galley fitting 510 may be adapted to the fastening member 502.

A floating archway may blend in with the main aisle way ceiling. This may enable a continuous look throughout the aircraft 310. The super galley 420, fastening member 502, super galley fitting 510 plus tie rods or cables may eliminate trusses that were placed between the rails 402. Each of these components may effectively be coupled to the lattice structure 400.

The galley fittings 510 on top of the super galleys 420 may provide a relatively flat surface. The floating archway ceiling may aesthetically blend in between super galleys 420 and the main aisleway ceilings. The floating archway ceiling may be coupled to the lattice structure 400.

Turning to FIG. 7, a side view of the aircraft super galley fitting 510 is provided. Described above, the rail 402 may be connected to the aircraft frame 450 through coupling members 408. The rail 402 may also be connected to cross bars 406 extending perpendicularly. The super galley fitting 510 may be coupled to a fastening member 502, which may be coupled to the rails 402. The fastening member 502, or a portion thereof, may extend slightly below the rail 402. More than one fastening member 502 may be used.

The super galley fitting 510 may be coupled to the fastening member 502 through one or more tie rods 702. These tie rods 702 may be placed parallel to the rail 402 and the super galley 420. The super galley fitting 510 may extend below the tie rods 702 or at least a portion thereof. The super galley fitting 510 may be a machined fitting, which may be coupled to the super galley 420.

FIG. 8 is a side view of another aircraft super galley fitting 510. The super galley fitting 510 may be coupled to the fastening member 502 through one or more cables 802. These cables 802 may be placed parallel to the rail 402 and the super galley 420.

For the super galley 420, multiple fastening members 502 may be used with multiple super galley fittings 510. The members 502 may be placed away from the super galley fittings 510 and coupled to one another through the tie rods 702 or cables 802. FIG. 9 is a side view of an aircraft super galley 420 taken from the right side of circle C of FIG. 4B and depicts a portion of a floating archway 702. FIG. 9 depicts a method of super galley attachment for super galleys 83" in width or less. Multiple galleys 420 may exist within the aircraft 310 and be connected as described above. Between the galleys 420 may exist floating archways 902.

Figure 10:
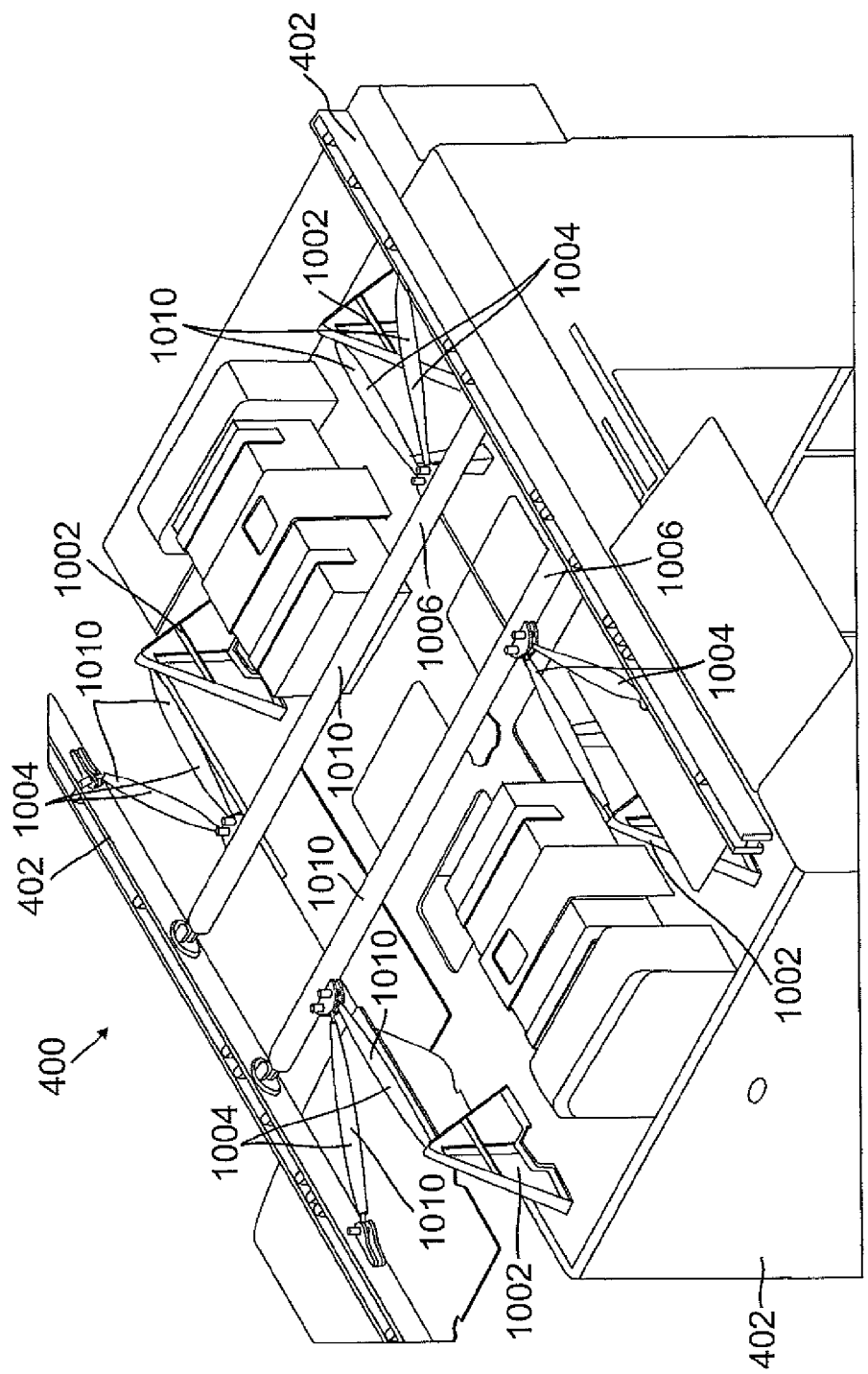
FIG. 10 is an isometric view of a different style of truss structure of the exemplary aircraft.

Turning to FIG. 10, an isometric view of a lattice structure 400 of the exemplary aircraft 310 may be shown with a different type of truss structure. Advantageously, truss structure 1010 coupled to the lattice structure 400 may essentially replace the trusses 108 shown in FIG. 1 and yet still provide the same benefits. A properly configured super galley 420 and its attachment methods to the lattice 400 may eliminate tripod supports 1002 and truss structure 1010 in favor of a much lighter and more efficient structure.

Figure 11:
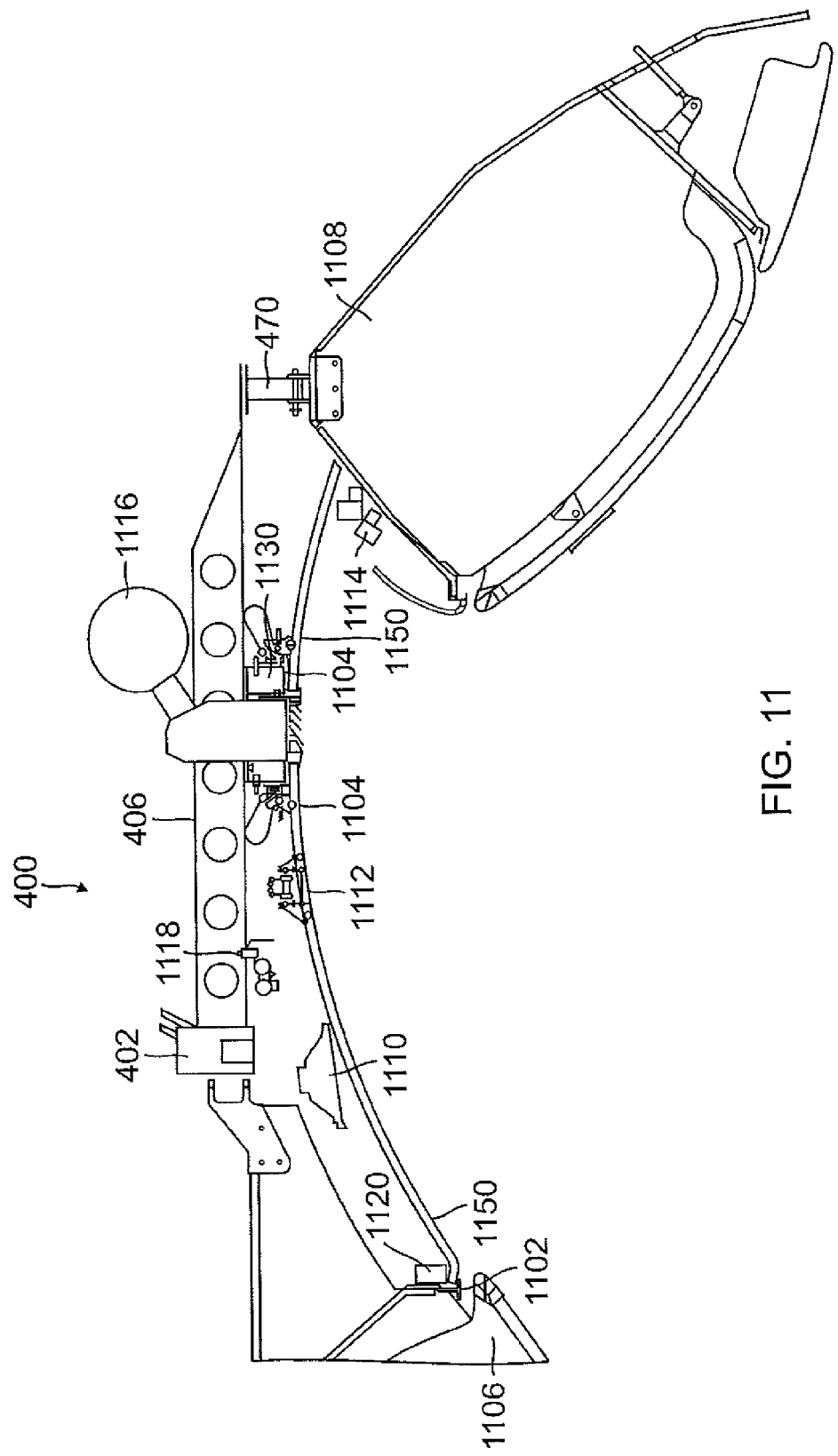
FIG. 11 is a view of the lattice structure in the exemplary aircraft having multiple ceiling panels.

Referring to FIG. 11, a closer view of the lattice structure 400 in the exemplary aircraft 310 having multiple ceiling panels 1150 is provided. The structure 400 may extend from an inboard bin 1106 to an outboard bin 1108. The rail 402, cross bar 406 and outboard rail 470 are shown. The ceiling panels 1150 may be coupled to the lattice structure 400. The ceiling panels 1150 may nest to a multi-purpose rail 1102 and then latches 1104 and 1120 to secure them. While the ceiling panels 1150 may be positioned as shown, the floating archway may take on many forms.

Figure 12:
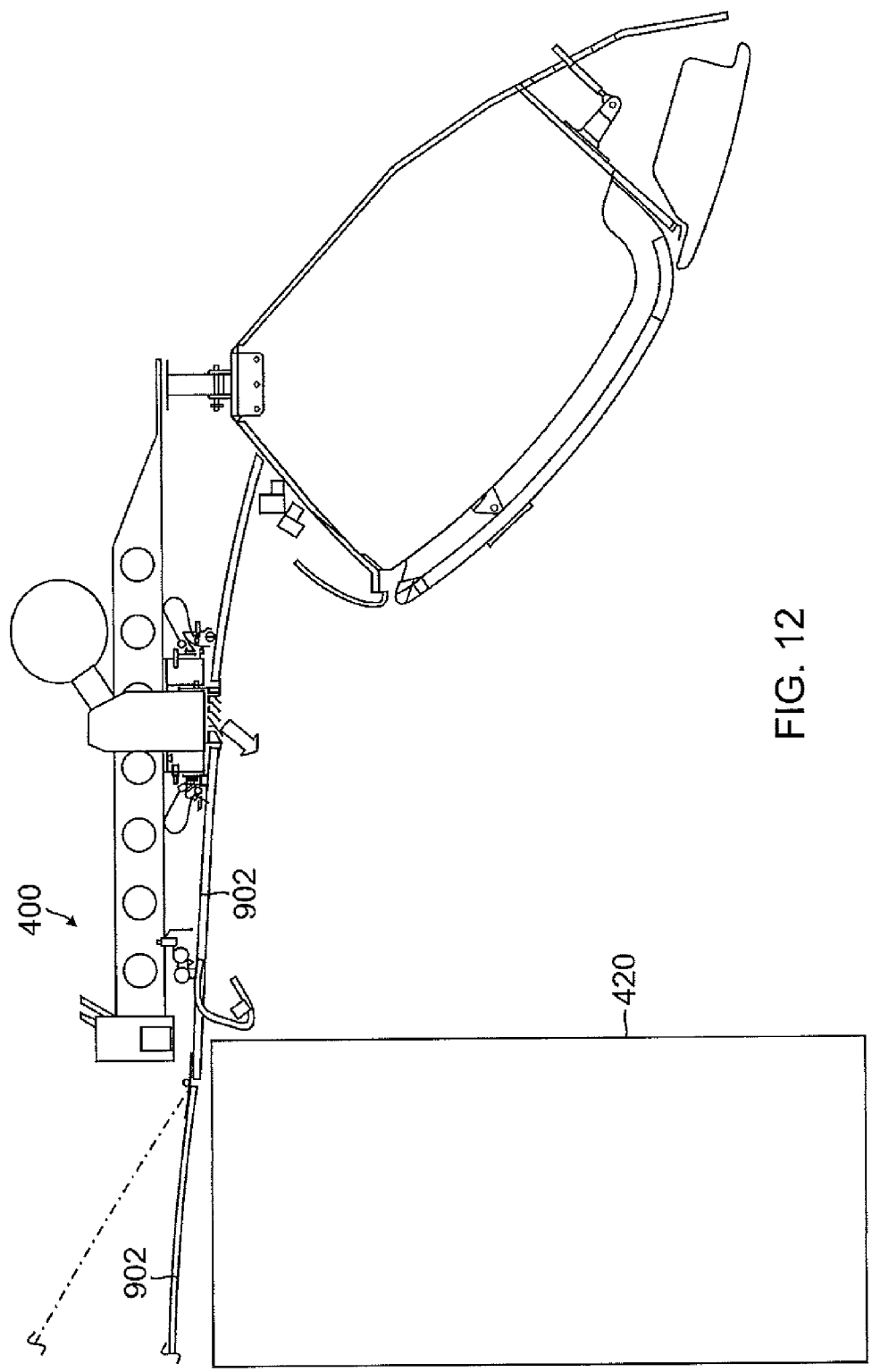
FIG. 12 is representative side view of a floating archway and super galley residing in a multiple ceiling panel exemplary aircraft.

Speakers 1110 and emergency lights 1112 may be embedded through the ceiling panels 1150. Other components within the ceiling panels 1150 may include bin and ceiling lights 1114. The ceiling panels 1150 may have an environmental control system 1116 nearby. Gaseous oxygen 1118 may be nearby. These components may be secured through the ceiling panels 1150 themselves or through the lattice structure 400. FIG. 12 is representative side view of a floating archway 902 and super galley 420. The floating archway 902 and super galley 420 may be coupled to the lattice structure 400 through those fittings described above.

Figure 13:
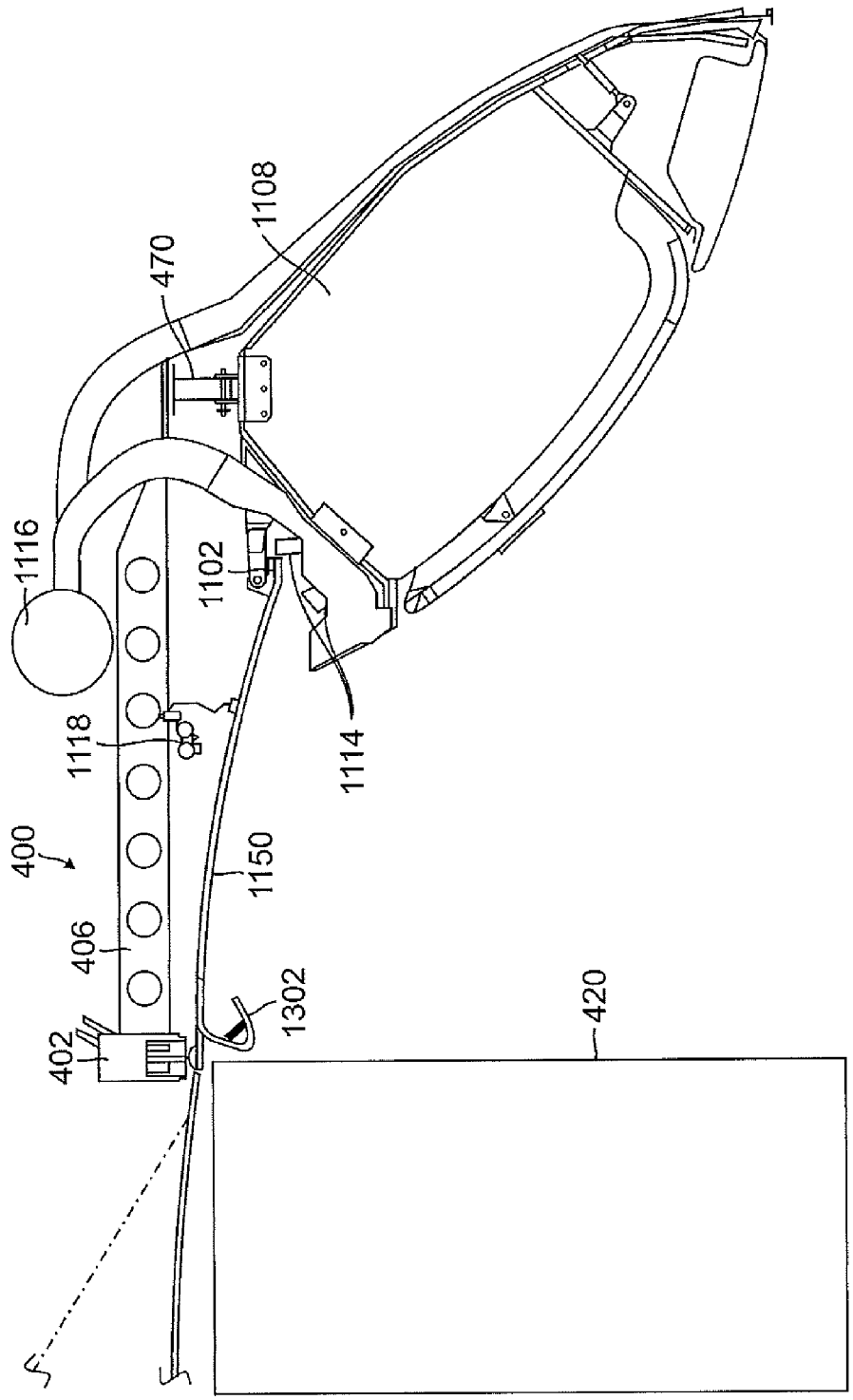
FIG. 13 is a view of the lattice structure in the exemplary aircraft having a single ceiling panel.

FIG. 13 is a closer view of the lattice structure 400 in the exemplary aircraft 310 having a single ceiling panel 1150. In one embodiment, a super galley 420 may be tied to structure 400 and on the other side an outboard bin 1108. The ceiling panel 1150 may be coupled to the bin 1108 through a hinge 1102. The ceiling panel 1150 may contain a valence 1302. Gaseous oxygen 1118 may be nearby as well as bin and ceiling lights 1114. The ceiling panel 1150 may have an environmental control system 1116 nearby.

Figure 1:
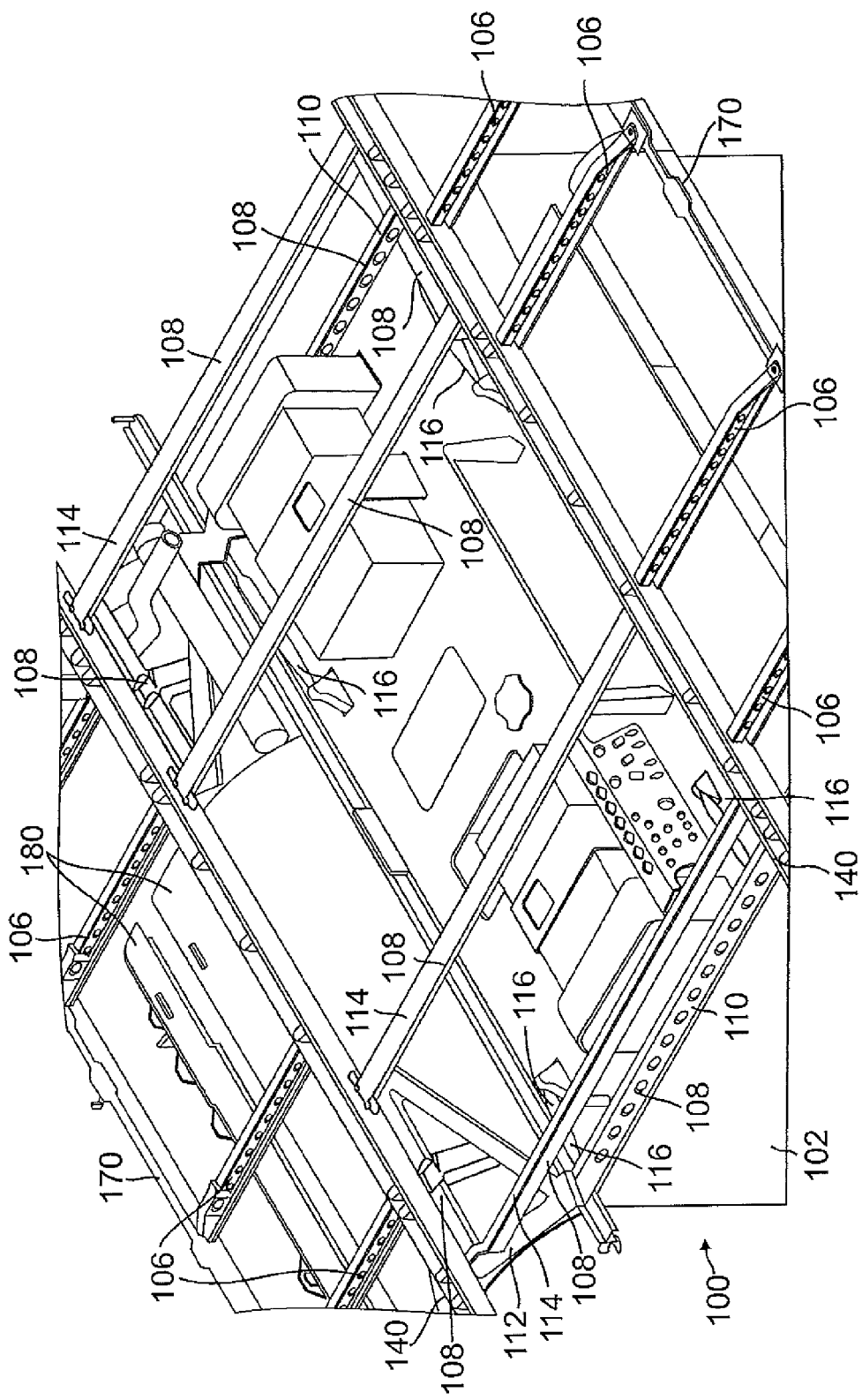
FIG. 1 is an isometric view of a galley monument support with trusses.
Figure 2:
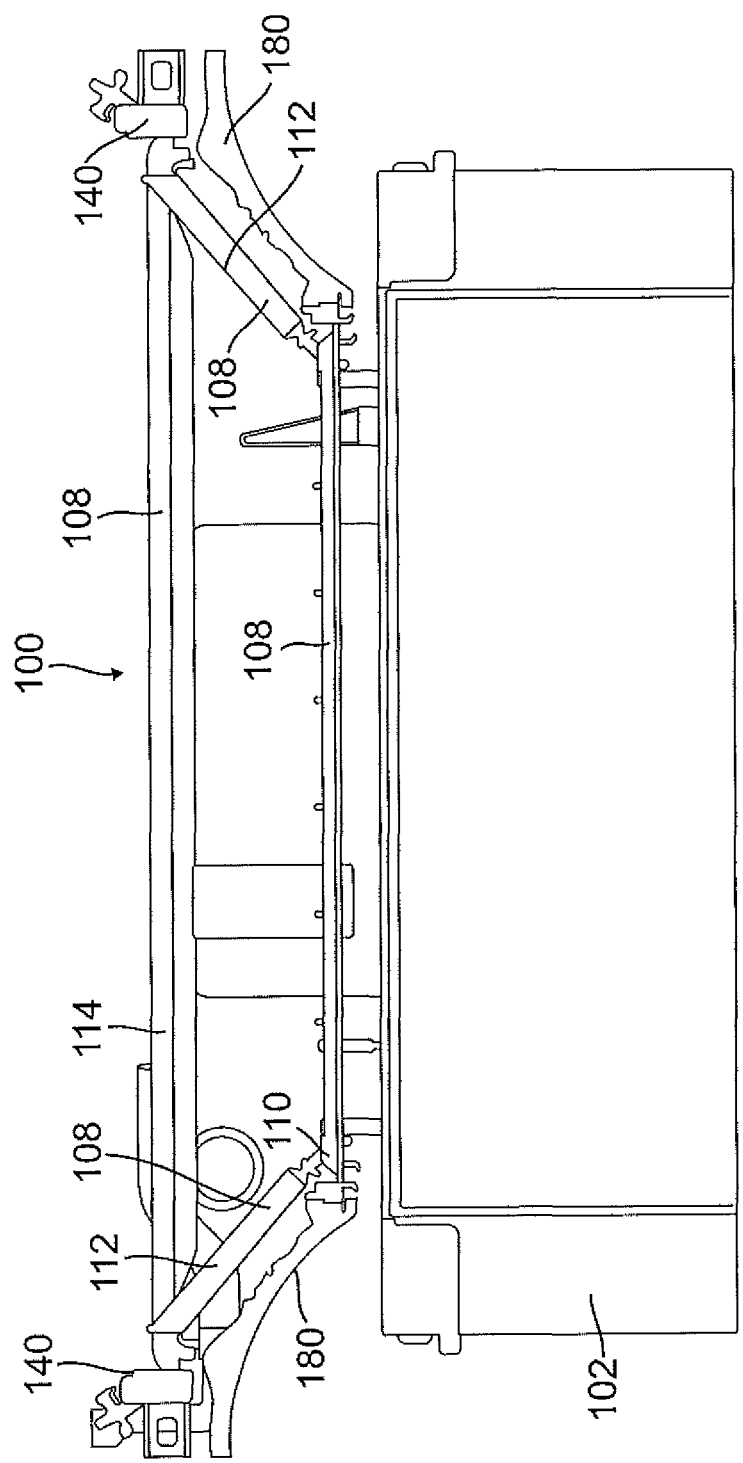
FIG. 2 is a side view of the support of FIG. 1.

In the embodiments shown in FIGS. 12 and 13, the trusses 108 of FIG. 1 may be removed. By eliminating them, a ceiling archway may be raised allowing an open feel. In one embodiment, new aircraft 310 may directly incorporate the lattice structure 400. The lattice structure 400 may also be implemented within post production aircraft 310 and super galleys 420 plus floating archways 902 may be retrofit in them.

The lattice structure 400, described above, may be manufactured using a variety of techniques and materials. In older aircraft 310, trusses 108 may be coupled to the rails 402. The trusses 108 may be removed from the rails 402 and super galleys 420 plus floating archways 902 may be retrofit in them.

Figure 14:
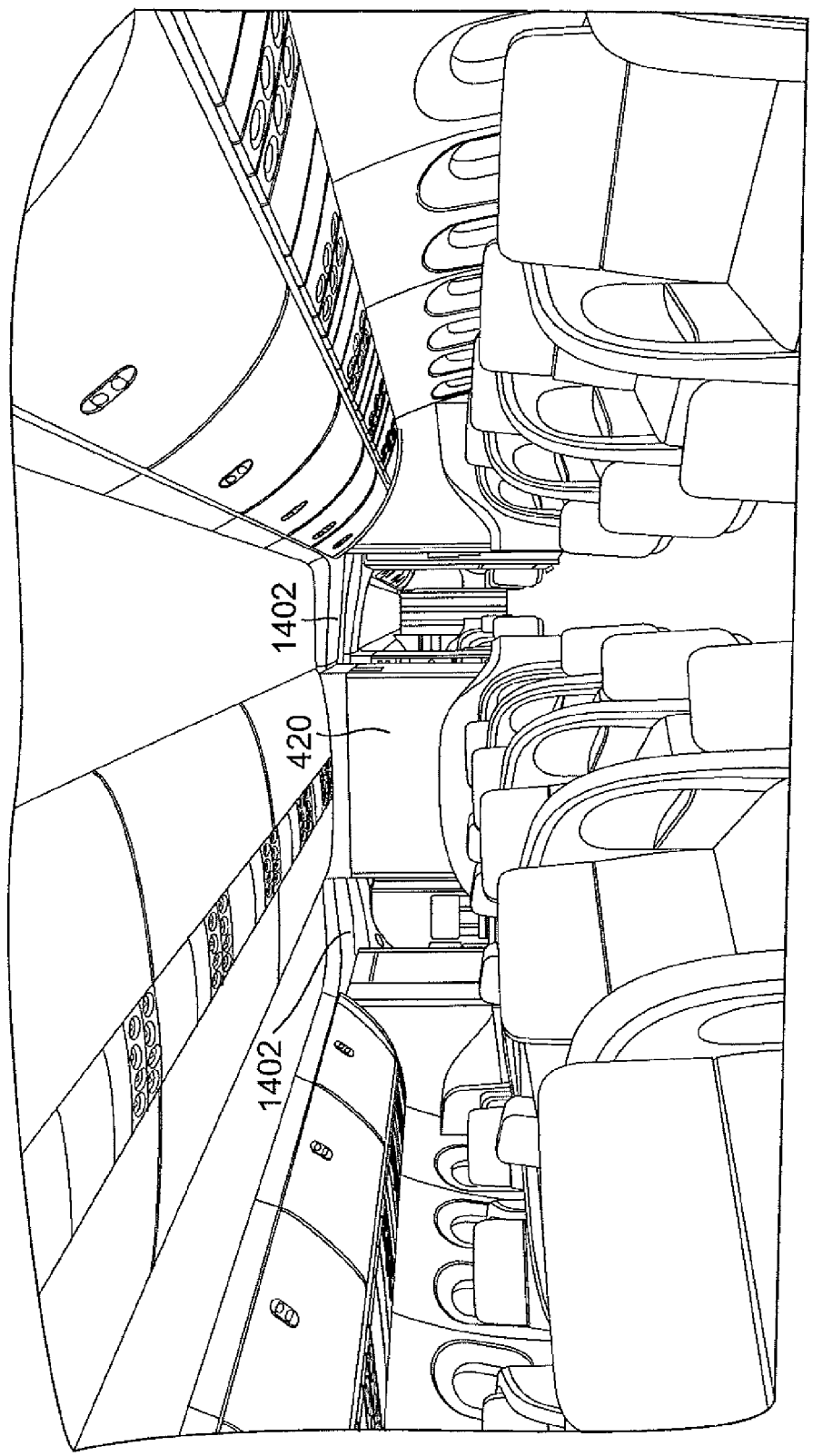
FIG. 14 is an interior view of the exemplary aircraft showing archway architecture.
Figure 15:
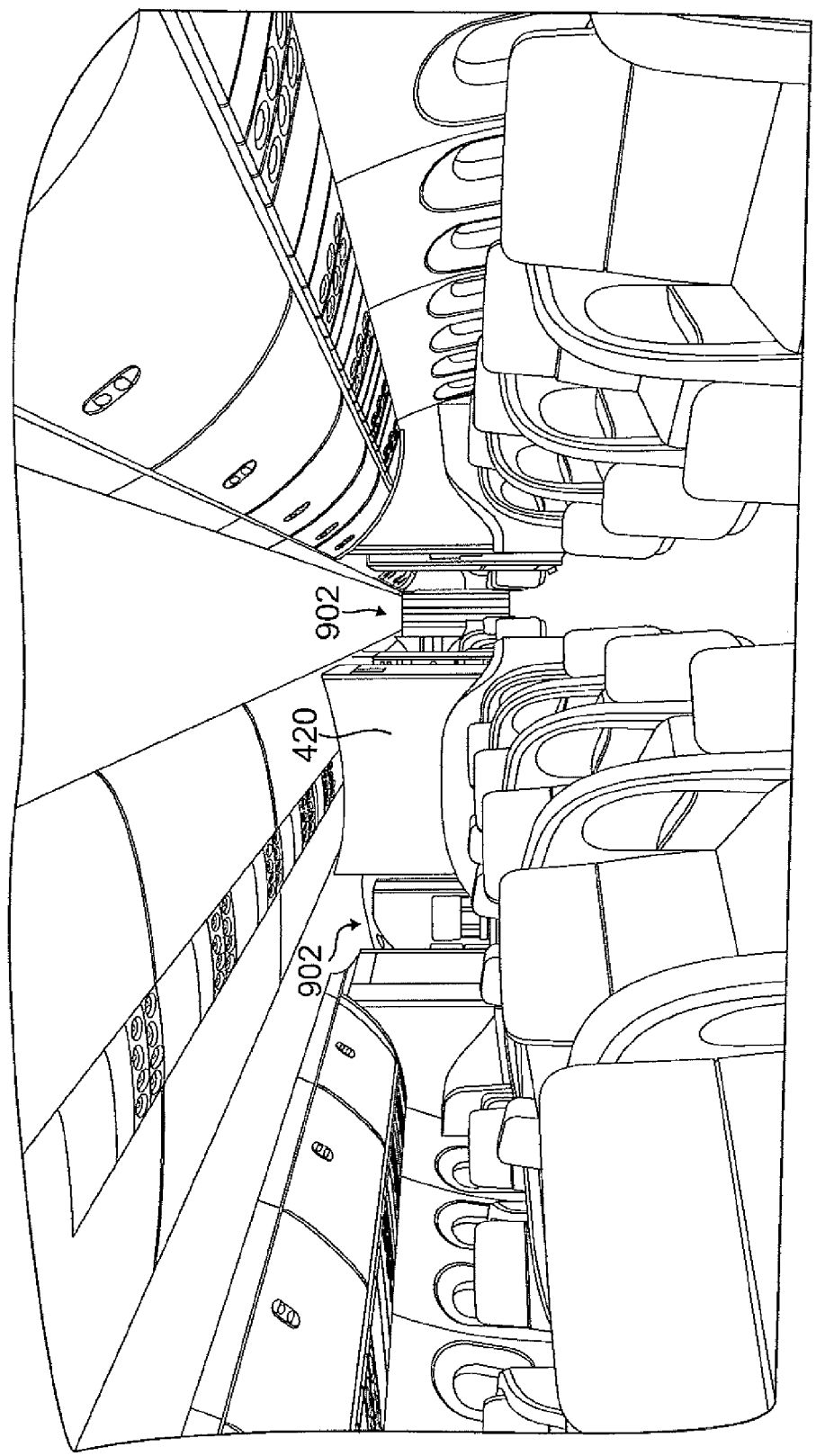
FIG. 15 is an interior view of the exemplary aircraft showing a floating archway ceiling.

FIG. 14 is an interior view of the exemplary aircraft 310 showing arches 1402 with a standard size galley or monument 420. FIG. 15 is an interior view of the exemplary aircraft 310 showing a floating archway 902 ceiling and super galley 420. The floating archway 902 expands the cabin space with the super galley 420 and provides a friendlier environment.

While embodiments of the disclosure have been described in terms of various specific embodiments, those skilled in the art will recognize that the embodiments of the disclosure may be practiced with modifications within the spirit and scope of the claims.

What is claimed is:

1. A structure for securing an aircraft structure comprising:
a first rail extending longitudinally;
a second rail extending longitudinally;
a plurality of tie rods to attached the first rail and the second rail to a frame of an aircraft housing the structure;
plurality of cross bars, wherein the plurality of cross bars comprises:
a first cross bar having a first end connected to the first rail and a second end connected to a first outboard rail; and
a second cross bar having a first end connected to the second rail and a second end connected to a second outboard rail; and
fastening members connected to the first and second rails;
a fitting connected to the fastening members through tie rods or cables, the fitting having a substantially flat surface contacting the super galley; and
a plurality of members extending between the first rail and the second rail and approximately planer to the super galley.

2. The structure of claim 1, wherein the first and second rails are H-shaped.

3. The structure of claim 1, wherein the first and second rails include class 3 size holes, the class 3 size holes configured to receive the tie rods or cables to couple the plurality of cross bars to one of the first cross bar or second cross bar.

4. The structure of claim 1, wherein the first and second rails extend across a length of an aircraft.

5. The structure of claim 1, wherein the first and second rails are parallel to each other.

6. The structure of claim 1, wherein the fastening members have two parallel extensions with the tie rods or cables placed therebetween.

7. The structure of claim 1, wherein the fittings have two parallel extensions with the tie rods or cables placed therebetween.

8. The structure of claim 1, wherein the tie rods or cables are parallel to the first and second rails and the super galley.

9. A structure for securing an aircraft structure comprising:
a first rail extending longitudinally;
a second rail extending longitudinally;
a plurality of coupling members to attached the first rail and the second rail to a frame of an aircraft housing the structure;
a first cross bar having a first end connected to the first rail and a second end connected to a first outboard rail; and
a second cross bar having a first end connected to the second rail and a second end connected to a second outboard rail;
fastening members connected to the first and second rails;
a plurality of fittings, one fitting connected to each of the fastening members and to the super galley; and
a plurality of members extending between the first rail and the second rail and approximately planer to the super galley.

10. The structure of claim 9, wherein the fitting has a substantially flat surface contacting the super galley.

11. The structure of claim 9, wherein the first and second rails are H-shaped.

12. The structure of claim 9, wherein the first and second rails include class 3 size holes, the class 3 size holes configured to receive one of tie rods or cables to couple the plurality of cross bars to one of the first cross bar or second cross bar.

13. The structure of claim 9, wherein the fastening members have two parallel extensions with tie rods or cables placed therebetween.

14. The structure of claim 9, wherein the fittings have two parallel extensions with tie rods or cables placed therebetween.

15. The structure of claim 9, wherein each fitting is connected to each fastening members through tie rods or cables, the tie rods or cables being parallel to the first and second rails and the super galley.

16. A structure for securing an aircraft structure comprising:
    a first H-shaped rail extending longitudinally;
    a second H-shaped rail extending longitudinally;
    a plurality of tie rods to attached the first H-shaped rail and the second H-shaped rail to a frame of an aircraft housing the structure;
    a first cross bar having a first end connected to the first H-shaped rail and a second end connected to a first outboard rail; and
    a second cross bar having a first end connected to the second H-shaped rail and a second end connected to a second outboard rail;
    fastening members connected to the first and second rails;
    a fitting connected to the fastening members through tie rods or cables, the fitting having a substantially flat surface contacting the super galley;
    a plurality of planer beams extending between the first H-shaped rail and the second H-shaped rail and approximately planer to the super galley.

17. The structure of claim 16, wherein the first and second H-shaped rails include class 3 size holes, the class 3 size holes configured to receive the tie rods or cables to couple the plurality of cross bars to one of the first cross bar or second cross bar.

18. The structure of claim 16, wherein the fastening members have two parallel extensions with the tie rods or cables placed therebetween.

19. The structure of claim 16, wherein the fittings have two parallel extensions with the tie rods or cables placed therebetween.

20. The structure of claim 16, wherein the tie rods or cables are parallel to the first and second rails and the super galley.

* * * * *